INVENTOR.
DAVID E. WIEGAND
BY
Arthur R. Woolfolk
ATTORNEY.

July 16, 1946.   D. E. WIEGAND   2,404,016
METHOD OF MAKING AN ELECTROMAGNETIC DEVICE
Original Filed Sept. 20, 1944   2 Sheets-Sheet 2
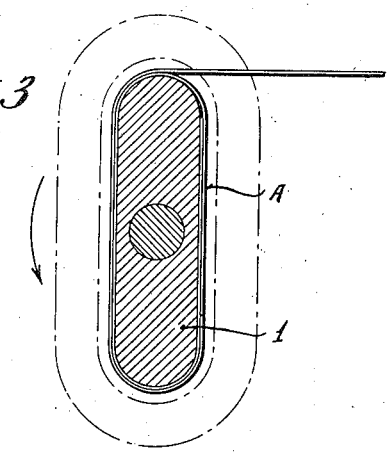
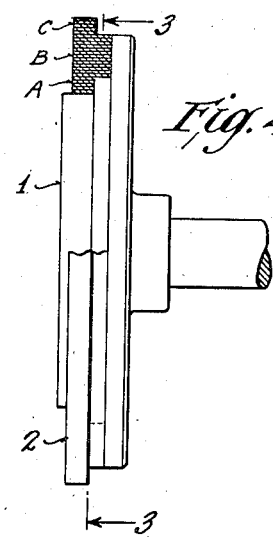
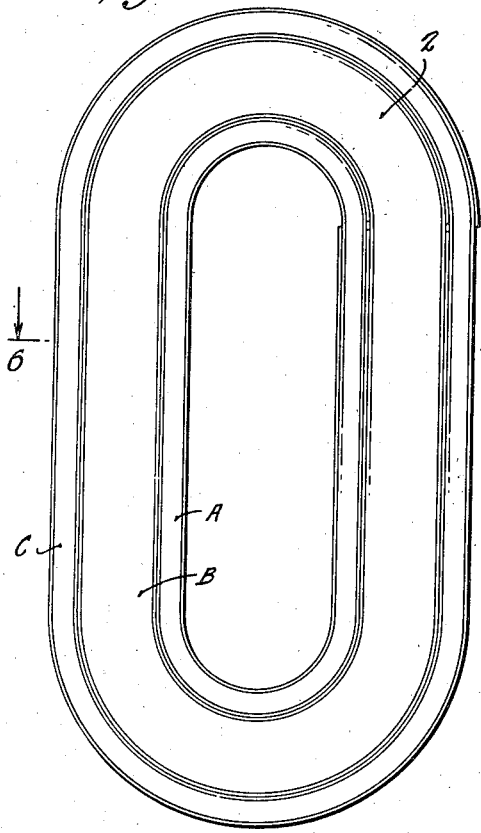
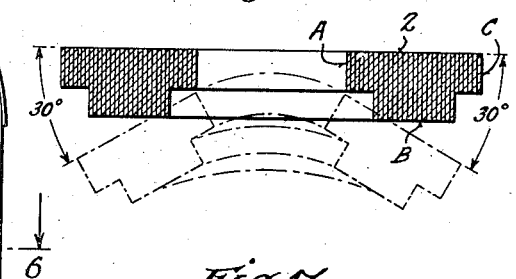
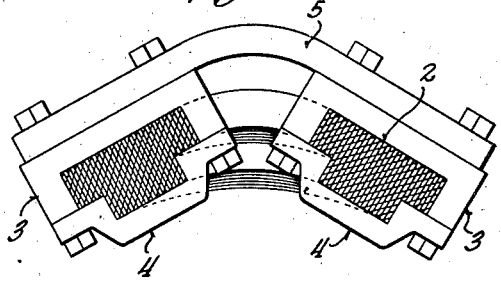
INVENTOR.
DAVID E. WIEGAND
BY
Arthur R. Woolfolk
ATTORNEY.

Patented July 16, 1946

2,404,016

UNITED STATES PATENT OFFICE

2,404,016

METHOD OF MAKING ELECTROMAGNETIC DEVICES

David E. Wiegand, Zanesville, Ohio, assignor to Line Material Company, South Milwaukee, Wis., a corporation of Delaware Original application September 20, 1944, Serial No. 554,945. Divided and this application July 13, 1945, Serial No. 604,908

2 Claims. (Cl. 29—155.57)

This invention relates to a method of making an electromagnetic device and is particularly directed to the method of making a three phase transformer.

This application is a division of my prior application, Serial No. 554,945, filed September 20, 1944, for Electromagnetic device and method of making the same.

Three phase transformers have heretofore been made of the stacked core construction in which a multitude of pieces of flat core steel were joined together by stacking to form the necessary shape of core for the three groups of conducting winding assemblies of the three phase transformer. This stacking operation entailed a high labor cost due to the long process of interleaving all of the small pieces of steel. Even in the initial stacking operation some mechanical stress was always imparted to the core pieces in the practical manufacture of the transformer and this reduced the efficiency of the transformer. Also in the stacked core construction it is necessary for the magnetic flux to traverse a multitude of air gaps and to travel cross grain at the corners of the core and this entailed a certain amount of loss in the core of the transformer.

This invention is designed to overcome the above noted defects, and objects of this invention are to provide a novel method of making a three phase transformer which has its core structure formed of wound magnetic ribbon, which is wound into three closed cores each preferably composed of a plurality of sections to form cores each of which has a half cruciform cross-section, in which no unusual care is required in the assembly of the parts of the device, in which no bending, machining or other working of the core structure is required after annealing and which therefore results in a finished core free from stresses, and in which short-circuiting of the laminations is avoided as the oxide film formed on the laminations is preserved and is not scraped off as there is no working subsequent to annealing.

Further objects are to provide a method of making a three phase transformer which has three identical cores each having a pair of straight leg portions with their planes at an angle to each other and with the straight leg portions joined by outwardly arched end portions and with each of the three conducting winding assemblies including the primaries and secondaries surrounding a straight leg portion of two of the cores, with the cores extending from the window of one conducting winding assembly directly through the window of the next conducting winding assembly, and with the cores free from transverse cuts or gaps thereby providing a three phase transformer which requires a low exciting current for the transformer, and thus allowing a more economical design of the three phase transformer by increasing the flux density and yet not exceeding the allowable limits of exciting current, such method producing a transformer in which the path of the magnetic flux follows the grain in the magnetic ribbon due to rolling, thus furthering economy by reducing core losses and exciting current and allowing the material to be worked economically.

Further objects are to provide a method of making a three phase transformer having three cores each of which is formed of a plurality of closed wound sections with two cores interlinking with a conducting winding assembly and with the straight leg portions of adjacent cores arranged with the edges of their laminations in the leg portions having a substantial edge to edge relation and jointly forming a cruciform cross-sectional shape to substantially fill the window of the conducting winding assembly, thus providing a good space factor, the method allowing the winding of the conducting winding assemblies as circular coils with all of the inherent advantages resulting therefrom such as the ability of the conducting winding to resist distorting forces due to short-circuit or similar conditions as the circular coil is considerably stronger than rectangular coils, and in addition to the mechanical strength entails less danger of damaging the insulation during winding than where a rectangular conducting winding assembly is employed as it requires less tension on the wire and no pounding of the coil to make a firm coil.

Further objects are to provide a method of making a core construction for an electromagnetic device in which a plurality of cores for winding assemblies are provided and in which the cores are positioned in a regular manner with their axes parallel and located at the corners of a regular polygon, in which the cores are each formed of magnetic ribbon wound to provide closed cores, with successive cores arranged with their laminations in substantial edge to edge contact to form that portion of the core section which receives the conducting winding assembly and to thus facilitate the free transfer of flux between adjacent portions with the minimum of air gaps.

In greater detail, further objects are to provide a novel method of making a three phase transformer which method contemplates the winding of three closed cores from magnetic ribbon either on a rectangular mandrel or on a circular mandrel in which latter case the cores would be subsequently given a generally rectangular shape having rounded ends, in either case providing three cores each having two straight leg portions preferably of half cruciform cross-section; the clamping of the straight leg portions and rotation of such portions through a relatively small angle while they are clamped to cause the laminations in one straight leg portion to be at an angle to the laminations in the other straight leg portion with the connecting end portions outwardly arched in a smooth, gradually varying curve; the subsequent annealing of the cores while they are held clamped in shape and while the straight leg portions are held in their angular relation to each other; and the final winding of three circular conducting winding assemblies each surrounding a straight leg portion of two cores and being wound in place.

The method is illustrated in the accompanying drawings, in which:

Figure 3 is a sectional view on the line 3—3 of Figure 4, showing, however, only a portion of the first section of the core wound in place on the mandrel.

Figure 4 is a view showing how a core is wound on a mandrel, such view being partly broken away and partly in section.

Figure 5 is a side elevation of one of the cores before it is bent.

Figure 6 is a sectional view on the line 6—6 of Figure 5, showing in dot and dash lines the position that the straight legs of the core take after bending.

Figure 7 is a view showing the core in section and clamped in bent position ready for annealing.

Figure 1:
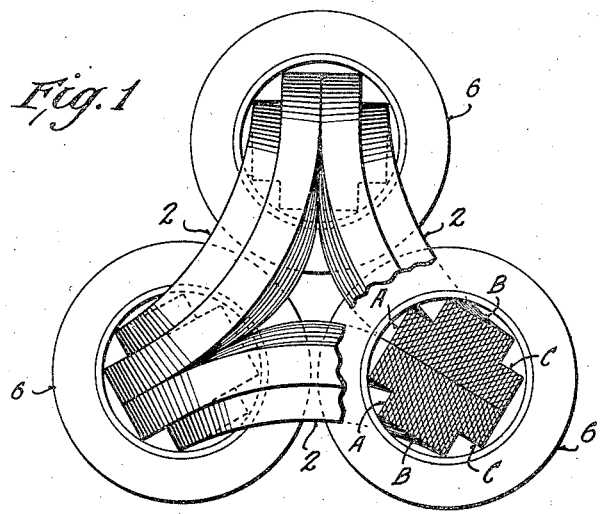
Figure 1 is a plan view of the transformer with parts broken away and parts in section.

The method used in making this transformer is to first wind one section of a core of the narrowest magnetic ribbon on a mandrel 1. This section is indicated by the reference character A. After this section has been built up to a sufficient extent, the end thereof is tack welded or brazed and a wider section of magnetic ribbon is wound in place and is indicated by the reference character B. This wider section rests partly on the previously wound section A and also on a shouldered portion of the mandrel. Its end is tack welded or brazed. Thereafter a narrow section C is wound on the section B and its end is tack welded or brazed. The section C and the section A are of the same width. If desired, other sections could be wound in place of the three sections A, B, and C to more nearly approximate a half circle, though it has been found that two of the half cruciform shapes shown in section in Figure 4 are sufficient to give a very good space factor, as will be seen from reference to Figure 1. The completed core is indicated by the reference character 2.

If desired, the mandrel may be a circular mandrel and thereafter the circular wound core may be shaped to provide two straight leg portions, as shown in Figure 5. It is preferable, however, to wind the core on a mandrel of approximately rectangular contour having rounded ends, as shown in Figure 3.

Referring to Figure 6, it will be seen that along one side of the core all of the edges of the laminations end in a common plane. The portions shown in full lines in Figure 6 show the core as it comes from the mandrel. The dot and dash lines show the core after it has been bent so as to turn the planes of the laminations of the two straight leg portions of the core at an angle to each other. Only a 30° turn for each straight leg portion is required as shown in Figure 6.

This invention is an improvement over that disclosed in the copending application of Arthur R. Woolfolk, Serial No. 512,134 filed November 29, 1943, for Electromagnetic device and method of making the same, for it will be seen that the angle through which the straight leg portions of the cores have to be bent in the present case is only 30°, whereas in the copending application the angle through which the straight leg portions have to be bent is 60°. In the copending application the straight leg portions were arranged back to back, whereas as will be seen as the description proceeds this invention arranges the adjacent straight leg portions in such a manner that there is parallelism between the laminations of adjacent core sections, and in addition there is substantially an edge to edge contact between the laminations of the adjacent core sections, thus allowing free transfer of flux from one core section to an adjacent core section with minimum air gaps.

After the core section is removed from the mandrel, the straight leg portions are clamped between the members 3 and 4 and thereafter are each turned through a 30° angle allowing the end portions to arch outwardly in a smooth curve. After the straight leg portions have been turned through the 30° angle as indicated, a brace 5 is bolted to the clamps so as to hold the straight leg portions with their laminations turned at an angle to each other as shown.

The core section is then annealed while it is held clamped in the position shown in Figure 7 so as to remove all stress and so as to cause it to take a set and remain in the position shown in Figure 7. After annealing the brace 5 is detached from the clamps and the clamps are removed from the straight leg portions. The core section will retain its shape after annealing.

After annealing there is no working of any sort—no bending, machining or any other type of working done on these core sections—and consequently there is no mechanical stress which would interfere with the magnetic characteristics of the core sections.

Figure 2:
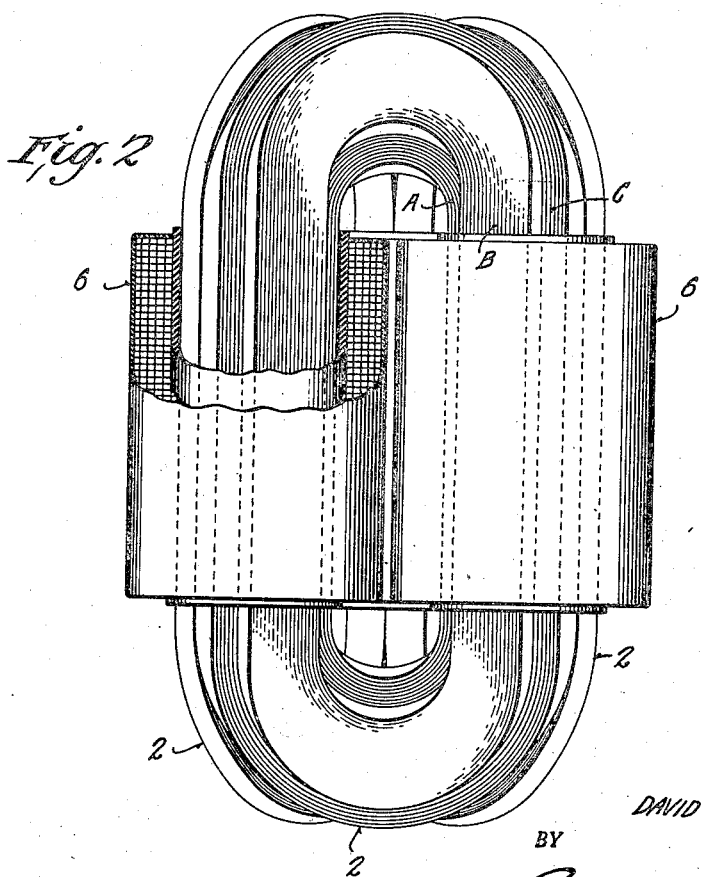
Figure 2 is a side elevation of the transformer with parts broken away and parts in section.

In assembling the transformer the core sections are positioned with their straight faces in contact with each other so as to secure a substantial edge to edge contact between the laminations of adjacent core sections, as shown in Figure 1. After the core sections have been assembled as described and as shown in Figure 1, the conducting winding assemblies 6, see Figures 1 and 2, are wound about the straight leg portions of adjacent core sections. These conducting winding assemblies include both the primaries and the secondaries and may be wound in any suitable manner directly on the cores. They may be wound, for example, on the winding machine disclosed in the patent to Steinmayer et al. No. 2,305,999 of December 22, 1942, for Method and machine for winding coils, or they may be wound on the machine disclosed in the patent to Schultz et al. No. 2,334,131 of November 9, 1943, for Machine for winding coils and method of winding coils.

These winding assemblies are circular and consequently have all of the inherent advantages resulting therefrom, such as the ability of the conducting winding assembly to resist distorting forces due to short-circuit or similar conditions, as circular coils are considerably stronger than rectangular coils. In addition to this there is less danger of damaging the insulation during winding than where a rectangular conducting winding assembly is employed as the circular winding requires less tension on the wire and no pounding on the coil to make a firm coil.

The magnetic ribbon may consist of any suitable material, such as either hot or cold rolled silicon steel. The method described is such that no sharp angles or bends are imparted to any portion of the cores and instead the rounded arched end portions connecting the straight leg portions of a core are gradually curved. This is shown most clearly in Figure 2 and it will be seen that there is no abrupt change in curvature from one portion of the arched end portions to any other portion of the arched end portions but that the change in curvature is gradual. In reality the arched end portions are somewhat conical and have their greatest curvature on their outer edges and their least curvature on their inner edges. This is a bending operation which is readily performed and does not require any special care. The arched end portions naturally form themselves as described when the straight leg portions are turned to the position shown in Figure 7.

It is to be noted from reference to Figure 1 that the axes of the three conducting windings are parallel and arranged at the apexes of an equilateral triangle. It is also to be noted particularly as set forth hereinabove that there is no sharp bending produced at the connecting arched end portions of the core sections but that the arched end portions are gradually arched and their radius of curvature varies gradually from point to point. This is an important factor in the making of a transformer as it enables the correct bending or angular positioning of the straight leg portions without unduly stressing the material at the curved and smoothly arched end portions.

It is to be noted also that due to the symmetrical arrangement of the transformer as shown most clearly in Figure 1, it is possible to mount the transformer in a circular tank.

It will be seen that a novel method of producing a three phase transformer as well as a novel method of producing a core construction for a three phase transformer has been provided by this invention. In addition to this it is to be noted that the process of making the transformer may be very rapidly followed and requires a very small number of operations to produce the final transformer.

The magnetic ribbon has a grain due to rolling which extends lengthwise of the ribbon and is most permeable to magnetic flux along the grain, that is to say, lengthwise of the ribbon. This invention utilizes this most permeable path as the magnetic flux is lengthwise of the ribbons in all of the core sections.

It is to be noted from reference to Figure 1 that there is a substantial edge to edge contact of the laminations in adjacent core sections. This construction, therefore, provides for the free transfer of flux from the straight leg portion of one core to the straight leg portion of the adjacent core.

It is within the province of this invention to grind the flat adjacent faces of the straight leg portions of adjacent core sections prior to annealing if so desired. Any wire edges that may result are either brushed off by a wire brush or otherwise removed, or may be burned off during annealing. It is also within the province of this invention to place a very thin insulating strip between the adjacent faces or to paint the adjacent faces with an insulating paint or varnish provided, however, that the parallel edges of the laminations in adjacent core sections are in very close juxtaposition approaching closely to an edge to edge contact. However, an edge to edge contact is preferred.

It is to be noted that the flux passing from one core section to an adjacent core section passes edgewise from the edge of one lamination into the edge of the corresponding lamination of the adjacent core section and does not have to traverse any air gaps between the flat faces of laminations. In this way minimum reluctance is obtained between adjacent core sections.

Also it is to be noted that a very small exciting current is required as the magnetic ribbon forming the core sections is continuous and is not broken by cross cuts with the resulting air gaps but instead is, as stated, formed of continuous closed wound magnetic ribbon.

While the invention is primarily directed to a method of making a three phase transformer, it is to be understood that the core construction may be used for other electromagnetic devices. It is to be noted further that while three main cores and three main winding assemblies have been shown and described, it is possible to use six main cores and six main winding assemblies for a three phase transformer and to still have the axes of the cores parallel and arranged in a regular order and located at the corners of a regular polygon, and, in other types of electromagnetic devices, to use a different number of cores and winding assemblies provided the symmetry of arrangement is preserved by having the axes of the cores parallel and arranged at the corners of a regular polygon.

Although this invention has been described in considerable detail, it is to be understood that such description is intended as illustrative rather than limiting, as the invention may be variously embodied and is to be interpreted as claimed.

I claim:

1. The method of making a three phase transformer comprising forming three closed cores of wound magnetic ribbon each core having a pair of straight leg portions, clamping the straight leg portions of each core and turning the clamped straight leg portions to place the planes of the ribbon in one straight leg portion at an angle to the planes of the ribbon in the other straight leg portion for each core and allowing the end portions to arch outwardly at each end of each core, annealing the cores while they are clamped and while the straight leg portions for each core are held in their angular relation to each other, assembling the cores with the edges of the laminations in adjacent cores arranged in a substantial edge to edge contact, and winding three conducting winding assemblies around the straight leg portions of the cores with each winding assembly surrounding a straight leg portion of each of two adjacent cores.

2. The method of making a three phase transformer comprising winding three closed cores of magnetic ribbon with each core having two straight leg portions joined by end portions and with each core formed of a plurality of sections consisting at least of a wider central section and narrow inner and outer sections, clamping the straight leg portions of each core and turning the clamped straight leg portions to place the planes of the ribbon in one straight leg portion at an angle to the planes of the ribbon in the other straight leg portion for each core and allowing the end portions to arch outwardly at each end of each core, annealing the cores while they are clamped and while the straight leg portions for each core are held in their angular relation to each other, assembling the cores with the leg portions of adjacent cores arranged with their laminations in substantial edge to edge contact and with the leg portions of adjacent cores forming a cruciform cross-section, and winding three circular conducting winding assemblies around the straight leg portions of the cores with each conducting winding assembly surrounding a leg portion of each of two adjacent cores.

DAVID E. WIEGAND.